United States Patent [19]

Tydlacka

[11] Patent Number: 4,853,500
[45] Date of Patent: Aug. 1, 1989

[54] JAMFREE CABLE STORAGE

[75] Inventor: Joseph Tydlacka, El Segundo, Calif.

[73] Assignee: Wyle Laboratories, El Segundo, Calif.

[21] Appl. No.: 131,740

[22] Filed: Dec. 11, 1987

[51] Int. Cl.$^4$ .................................. H02G 11/00
[52] U.S. Cl. .................................. 191/12 R; 254/382
[58] Field of Search .......... 191/12 R, 12.2 R, 12.2 A, 191/12.4; 242/83; 254/382; 226/119

[56] References Cited

U.S. PATENT DOCUMENTS

| | | | |
|---|---|---|---|
| 1,999,261 | 4/1935 | Shultz et al. | 191/12.2 R |
| 2,184,363 | 12/1939 | Shultz et al. | 191/12 R |
| 3,258,545 | 6/1966 | Bernard, Jr. | 191/12.2 R |
| 3,876,045 | 4/1975 | Knarreborg | 191/12.4 |
| 3,943,306 | 3/1976 | Aihara et al. | 191/12.2 R |
| 3,977,037 | 8/1976 | Miyake et al. | 254/382 |
| 4,154,324 | 5/1979 | Upton et al. | 191/12.2 R |
| 4,165,830 | 8/1979 | Svendsen | 254/382 |

Primary Examiner—Johnny D. Cherry
Assistant Examiner—Joseph D. Pape
Attorney, Agent, or Firm—Freilich, Hornbaker Rosen & Fernandez

[57] ABSTRACT

Apparatus is provided for retrieving an elongated flexible cable-type member such as a thick electrical cable used at airports to supply power to airliners, which stores the cable in a bin in a manner that avoids repeated twisting of the cable and the consequent possibility of jamming. A horizontally-extending roller lies behind a front opening in the bin to support the cable. The roller is able to freely shift from side to side, to encourage the cable to store in repeated figure-8 loops that have no net twist.

8 Claims, 1 Drawing Sheet

U.S. Patent　　　Aug. 1, 1989　　　4,853,500
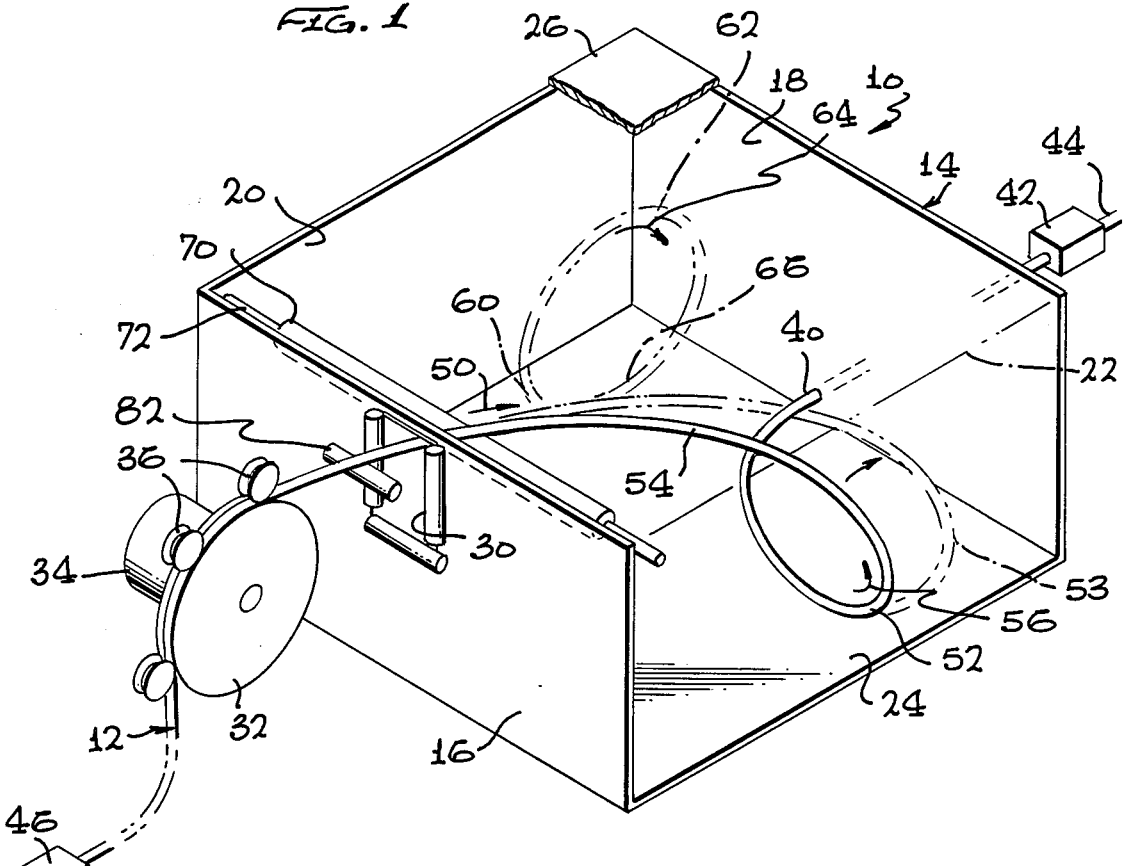
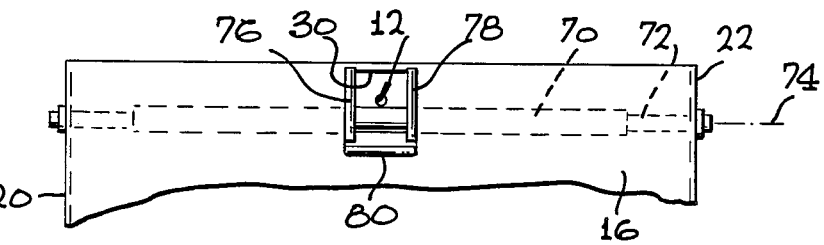
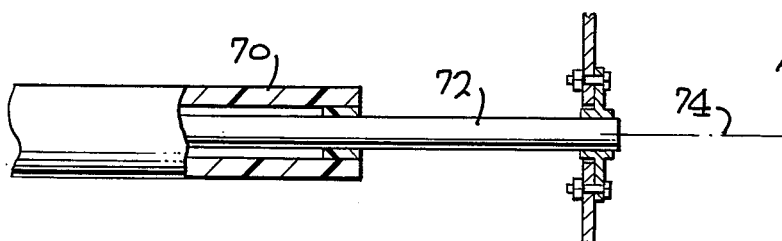
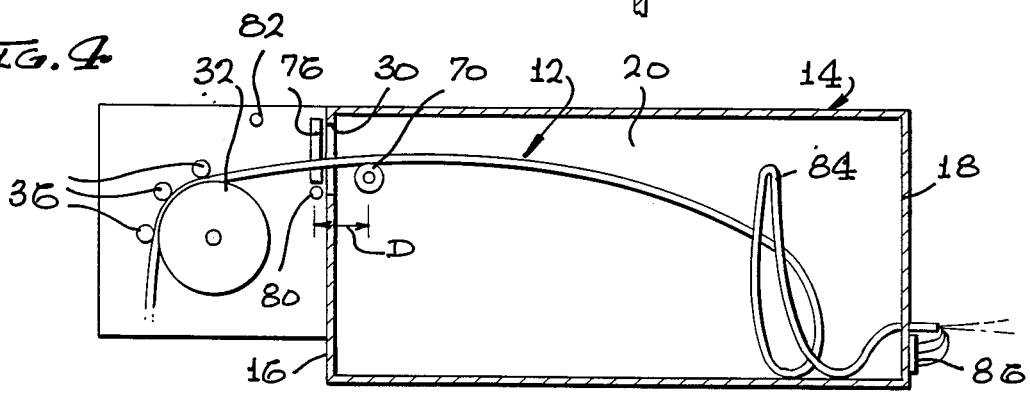

JAMFREE CABLE STORAGE

BACKGROUND OF THE INVENTION

Elongated flexible members such as cables and hoses must often have inner ends fixed in position to connect to electrical or water supplies or the like, and must be repeatedly retreived for storage in a bin or payed out from the bin for use. One example of this is a cable retreiving apparatus used at airports which must retreive a rubber-coverd electrical cable of a diameter of about 1½ inches and a length of perhaps 100 feet, that is pulled out to airliners to supply power on the ground. The inner end of the cable lies in a storage bin where it is continually connected (through a relay) to a power supply. A wheel near a front opening in the bin moves the cable into and out of the bin.

When the cable has been moved into the bin, it has generally formed multiple largely circular loops. As the cable forms each circular loop, the cable is twisted by 360°, and the free end of the cable which is approaching the bin is repeatedly turned to undo the twist. This has the disadvantage that if a workman holds the outer end of the cable off the ground as it is retreived, he must let the cable end repeatedly turn. Also, the twisted cable in the bin places the wires in the cable under stress, which can lead to failure. An even greater problem is that the twisted cable lying in circular loops easily jams, as when one circular loop gets moved under a previously laid-down loop. It can take considerable time and effort to unjam the stored cable. A cable retreiving apparatus which avoided twisting of the cable as it was moved into and stored in a bin, would be of considerable value.

SUMMARY OF THE INVENTION

In accordance with one embodiment of the present invention, an apparatus is provided for retreiving and storing an elongated and flexible member such as a cable or hose, which minimizes twisting of the elongated member. The apparatus includes a support lying substantially in line with a bin opening to support the elongated member, such as a cable, as it moves through the opening into the bin. The support is mounted so that it is freely moveable substantially horizontally toward either side of the bin. As the rearwardly-moving cable forms a portion of a circular loop at a first side of the bin, and tends to be laid down toward the other side of the bin to avoid twisting required to lay it into a circular loop, the support moves toward the second side of the bin. This allows the cable to be laid in a partial circular loop at the other side of the bin. The repeated laying of the elongated member in partial circular loops alternately at either side of the bin results in the member being laid down into "figure-8" loops. Each half of the figure-8 is oppositely twisted, resulting in no net twist in the elongated member. The absence of substantial elongated member twist minimizes jamming, minimizes stress, and avoids repeated turning of a free end of the member as it is retreived.

The support is preferably in the form of a roller which can rotate and slide about its axis, with its axis extending horizontally and largely perpendicular to the direction of movement of the elongated member through the opening in the bin. The bin can be formed with small vertical side rollers and a small horizontal lower roller at the bin opening, and the support roller is preferably positioned a distance rearward of the bin opening to provide the most support for the elongated member before it is laid down.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified perspective view of a retreival apparatus of the present invention showing, in phantom lines, different positions of the elongated member as it is stored in the bin.

FIG. 2 is a partial front elevation view of the apparatus of FIG. 1.

FIG. 3 is a more detailed view of a portion of the apparatus of FIG. 2.

FIG. 4 is a sectional side view of the apparatus of FIG. 1.

DESCRIPTION OF THE PREFERRED EMBODIMENTS

FIG. 1 illustrates an apparatus or system 10 for retreiving and paying out an elongated flexible member in the form of an electrical cable 12. The system includes a storage bin 14 having a front and rear 16, 18, opposite sides 20, 22, and a bottom and top 24, 26. The front forms an opening 30 near the top through which the cable is moved into and out of the bin. A traction wheel 32 driven by a motor 34, and rollers 36 pressing toward the wheel, move the cable. A particular cable 12 is used at airports to supply electrical power to parked aircraft. The cable has an inner end 40 connected through a relay 42 to an electrical power supply 44, and has an outer end 46 forming a connector that can be plugged into a receptical on the aircraft. During payout of the cable, a worker holds the outer cable end and pulls it to the aircraft as the motor turns the wheel 32. To retreive the cable, the motor turns the wheel in the opposite direction to move the cable rearwardly to the bin, as the worker holds the outer cable end 46 above the ground to minimize damage to it.

As the cable moves in the rearward direction indicated by the arrow 50 through the opening 30 into the bin, the cable first tends to form a partial circular loop indicated at 52. As the loop reaches the configuration shown at 53, the next portion 54 of the cable to be stored has, in prior systems, tended to continue in the same direction of curvature as the loop portion 52 to form a substantially circular loop (actually a spiral). Such repeated turning of the cable in the same counterclockwise direction indicated at 56, results in repeated twisting of the cable. Such repeated twisting can cause jamming of the cable in the bin, if one of the circular loops falls behind a previously laid-down circular loop. Also, as the cable twists, the conductors of the cable are stressed, which increases the possibility of damage. Furthermore, as the cable twists the free outer end 46 of the cable repeatedly turns, making it more difficult for a workman to hold the outer end of the cable above the ground as the cable is retreived.

Applicant has found that the next portion 54 of the cable following the partial loop 52 which lies near one side 22 of the bin, tends to move away from the loop 52 towards the opposite side 20 of the bin. Also, applicant has found that if this cable portion 54 is supported without substantial restriction against such sideward movement, it will move toward the opposite side of the bin and lay down in the configuration shown at 60. The cable at the second side 20 of the bin will then form another partial circular loop 62 as it is layed in a clockwise direction indicated at 64. If the next portion 66 of the cable to be laid down, is supported in free horizontal movement towards the first side 22 of the bin, the portion 66 will lay down in another partial loop at the first side 22 of the bin. In tests, applicant initially supported the cable in side-to-side movement with his hand. The resulting partial loops at opposite sides of the bin, with the cable turned in an opposite direction (clockwise or counterclockwise) at the opposite sides, results in repeated "figure-8" loops, which have no net twist. Applicant has found that this avoids jamming of the cable in the bin, and also avoids repeated turning of the free outer end 46 of the cable as the cable is retreived or payed out.

In accordance with the present invention, applicant provides a support in the form of a support roller 70 which supports the cable and which can freely shift toward opposite sides 20, 22 of the bin. A portion of the roller lies substantially in line with the opening 30, as shown in FIG. 2, so the cable 12 extends over the support roller and some of its weight rests thereon. When the portion 54 of the cable, which lies between the support roller 70 and the last loop whose weight rests on the bin, approaches the end of a partial circular loop 52, and the resistance of the cable to twisting urges it to lay down at the other side of the bin, the roller 70 slides toward the corresponding side of the bin to carry the cable portion thereto to form a figure-8. As shown in FIGS. 2 and 3, the roller is rotatably and slideably held on a holding means in the form of a horizontal shaft 72 which extends between opposite sides of the bin. Thus, the roller is free to rotate about its axis 74 and to slide along its axis 74 under forces applied thereto by the cable. Although a nonrotating support can be used which freely shifts from side to side and which is formed of a low friction material such as Teflon, lower friction and more reliable figure-8 cable storage is obtained by the use of a freely rotating roller.

The system includes three small rollers around the opening 30 in the bin, including a pair of rollers 76, 78 at opposite sides of the opening and rotatable about vertical axes, and a lower roller 80 at the bottom of the opening and rotatable about a horizontal axis. These rollers minimize friction of the moving cable with the bin opening walls. An additional top roller 82 lies forward of the opening. The support roller 70 lies a distance D rearward of the rollers 76–80 at the opening 30, and its upper surface preferably lies higher than the opening roller 80, to at least partially support a length of cable between the motor-driven wheel 32 and the stored portion 84 of the cable that lies in figure-8 loops in the bin.

Applicant has constructed a cable retreiver of the type shown in the drawings, which stores cable of a diameter of about 1½ inch. The bin had a width between opposite sides of 48 inches, a length of 40 inches, and height of 20 inches. The roller 70 had a width of 36 inches, and was able to slide horizontally a distance of about 10 inches which is greater than the width of the cable and which is more than half the width of the opening. The width of the opening 30 was about 5 inches, and the height was about the same. Applicant found that when a cable was being moved in the forward direction for storage into the bin, that as the middle portions of each figure-8 loop was being laid down, the roller 70 would move sidewardly by a distance of about 6 inches. Applicant found that the cable was reliably stored in figure-8 loops and that the free outer end of the cable did not undergo continuous rotation, as has occured in the prior art where the cable was stored in circular loops.

Most rollers used in machinery are not intended to shift axially, although clearances are provided at their ends to avoid binding. Even in nonprecision, rough equipment, such clearances provided to avoid binding are much less than one inch. Applicant's roller 70, used to store cable of a diameter on the order of magnitude of an inch, is mounted to allow free horizontal movement of much more than one inch.

It should be noted that applicant has found that when a new cable is stored in the bin, it acquires a twist. At a typical busy airport where the cable is payed out and retreived perhaps five to twenty times per day, damage to the cable is avoided by having a workman relieve the twist about every two weeks, at least for several weeks after a new cable is stored and until the jacket around the wires becomes set. Untwisting is accomplished by the workman deconnecting the inner end 40 of the cable from a group 86 of terminals fixed with respect to the bin, and allowing the cable to untwist itself. The inner end 40 of the cable was mounted to extend through the rear well 18 and to make electrical connections outside the bin.

The retreival apparatus is useful in the storage of other elongated flexible members, especially those whose inner end is fixed in position, such as hoses and ropes. The laying of such an elongated flexible member in figure-8 loops instead of circular loops, greatly reduces the possibility of jamming, avoids the repeated turning of the outer end of the member which is desirable even for a free outer end, and minimizes twisting and consequent stress on the elongated member. The avoidance of twisting on an electrical cable, helps avoid damage to the conductors and insulators of which the cable is composed, and a similar benefit is available in other flexible elongated members.

Thus, the invention provides apparatus for retreiving an elongated flexible cable-type member (which may be a hose, rope, etc.) which facilitates storage of the member. This is accomplished by providing a support member over which the elongated member moves, at least during forward movement into the storage bin, where the support is moveable substantially horizontally and perpendicular to the general direction of elongated member movement. The support is preferably a roller which can rotate and slide laterally about its axis. The support encourages storage of the elongated member in figure-8 loops, which avoids twisting of the elongated member, and consequent jamming, continuous rotation of the outer end of the member, and the imposition of stresses on the member.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An apparatus for retreiving an elongated flexible member, which includes a storage bin having a front and opposite sides and having an opening in said front, and which includes means for moving said elongated member in a generally rearward direction through said opening into said bin, the improvement comprising:

a support;

means for holding said support at a location to support said flexible member as it moves through said opening into said bin, said holding means supporting the weight of said support and of the portion of said flexible member thereon while allowing said support to move in substantially free horizontal movement towards said opposite sides of said bin by a distance greater than one inch.

2. The improvement described in claim 1 wherein:

said support comprises a roller having an axis, and said means for holding supports said roller in free rotation about its axis and free sliding along its axis, with said axis extending substantially horizontally and perpendicular to said rearward direction in which said elongated member move through said opening.

3. The improvement described in claim 2 wherein:

said opening has opposite sides; and including a pair of side guide rollers lying at said opposite sides of said opening, each of said guide rollers being rotatable about a substantially vertical axis, and said first mentioned roller lies a distance spaced rearward of said guide rollers.

4. Apparatus for retrieving an elongated flexible member of predetermined width, comprising:

a storage bin having a front wall with an upper portion and having opposite sides, said front wall having an opening in said upper portion thereof;

a roller having an axis;

means for supporting said roller in rotation about said axis and in sliding along said axis by more than the width of said elongated member, with said axis lying substantially no further forward than said opening and with a portion of said roller positioned with respect to said opening to support said elongated member substantially as it passes through said opening.

5. Apparatus for use at an airport to pay out and retrieve an electrical cable, comprising:

a storage bin having a front and opposite sides, and having an opening in said front;

a wheel lying forward of said opening;

a cable having an inner end fixed in position in said bin and an outer end lying forward of said wheel, said cable extending through said bin opening and around said wheel and said cable having a diameter on the order of magnitude of an inch;

a motor coupled to said wheel to rotate it in directions to move said cable in cable-moving directions rearwardly into said bin and forwardly out of said bin;

a shaft having an axis extending substantially horizontally and perpendicular to said cable-moving directions, and lying substantially in line with said opening to support the cable as it moves through said opening;

a roller mounted on said shaft, said cable lying on said roller, said roller being rotatable about said axis and freely slideable along said axis by a distance of at least an inch under forces applied by said cable to said roller.

6. A method for storing a flexible elongated member in a storage bin which has a front with an opening and opposite sides, comprising:

moving the flexible member in a rearward direction through said opening into the bin;

supporting portions of said member which are moving through said opening into said bin on a support, and supporting said support so it can move toward either side of said bin by a distance greater than the width of the member under the influence of twist resistance of the member while said support continues to support part of the weight of said member portions.

7. The method described in claim 6 wherein:

said step of supporting includes supporting said flexible member on a roller lying rearward of said opening and having an axis extending substantially horizontally and perpendicular to said rearward direction, and supporting said roller in rotation about its axis and sliding along its axis by a distance greater than the width of the member.

8. Apparatus for use at an airport to pay out and retrieve an electrical cable, comprising:

a storage bin having a front and opposite sides, and having an opening in said front;

a wheel lying forward of said opening;

a cable having an inner end fixed in position in said bin and an outer end lying forward of said wheel, said cable extending through said bin opening around said wheel;

a motor coupled to said wheel to rotate it in directions to move said cable rearwardly into said bin and forwardly out of said bin;

a shaft lying in said bin and having an axis extending substantially horizontally and between said opposite sides of said bin, and lying behind said opening;

a roller mounted on said shaft, said cable lying on said roller, said roller being rotatable and slideable about and along said axis;

said opening having a predetermined width, and said roller being freely slideable along said axis by a distance greater than the width of said opening.

* * * * *